Jan. 1, 1974 P. F. HELFREY ET AL Re. 27,857
HYROCRACKING PROCESS WITH REGULATION OF THE AROMATIC CONTENT OF THE PRODUCT
Original Filed Jan. 23, 1962
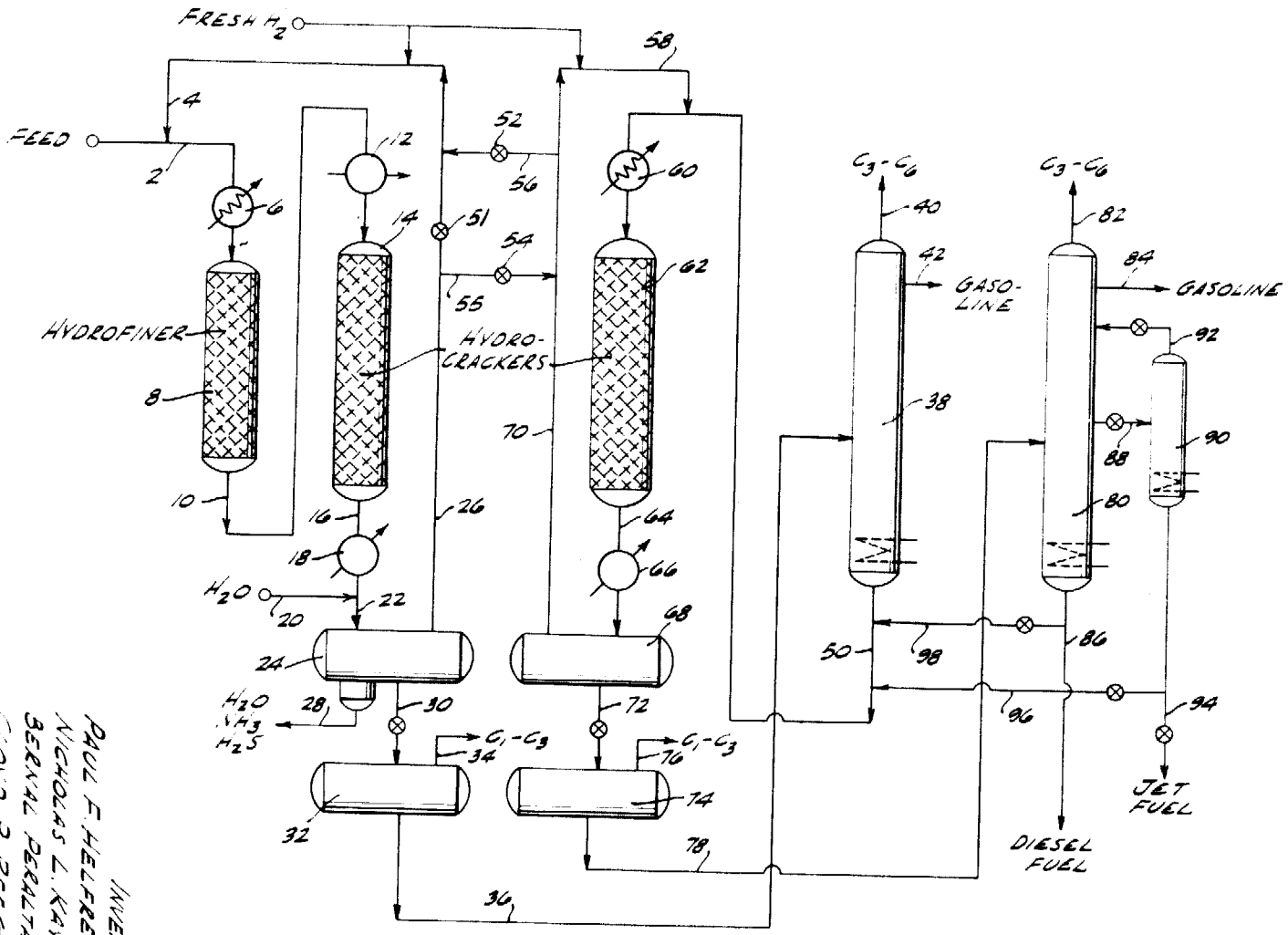
INVENTORS
PAUL F. HELFREY,
NICHOLAS L. KAY,
BERNAL PERALTA,
CLOYD P. REEG,
BY ROWLAND C. HANS FOR
Thomas S. Henderson
ATTORNEY United States Patent Office Re. 27,857
Reissued Jan. 1, 1974

27,857

HYDROCRACKING PROCESS WITH REGULATION OF THE AROMATIC CONTENT OF THE PRODUCT

Paul F. Helfrey, Whittier, Nicholas L. Kay and Bernal Peralta, Fullerton, Cloyd P. Reeg, Orange, and Rowland C. Hansford, Yorba Linda, Calif., assignors to Union Oil Company of California, Los Angeles, Calif.

Original No. 3,132,090, dated May 5, 1964, Ser. No. 168,058, Jan. 23, 1962. Application for reissue June 18, 1971, Ser. No. 154,632, which is a continuation of abandoned reissue application Ser. No. 745,645, May 27, 1968

Int. Cl. C10g *13/02, 13/10*

U.S. Cl. 208—111 7 Claims

Matter enclosed in heavy brackets [ ] appears in the original patent but forms no part of this reissue specification; matter printed in italics indicates the additions made by reissue.

*ABSTRACT OF THE DISCLOSURE*

*In the hydrocracking of mineral oils with a Group VIII noble metal hydrocracking catalyst, a relatively aromatic gasoline product is produced by maintaining relatively high hydrogen sulfide hydrogen ratios in the reaction zone, while relatively non-aromatic products, e.g. jet fuels and/or diesel fuels, are produced by reducing the hydrogen sulfide/hydrogen ratio.*

*This application is a continuation of application Ser. No. 745,645, filed May 27, 1968 and now abandoned.*

This invention relates to a catalytic hydrocracking process affording a maximum degree of flexibility in reference to variety and quality of products obtainable therefrom. More specifically, the process is designed to produce from hydrocarbon feedstocks a relatively aromatic product boiling in the gasoline range, and/or relatively non-aromatic products boiling in the jet fuel-diesel fuel range. In broad aspect, the principal operative features of the process comprise contacting the hydrocarbon feedstock with a Group VIII noble metal hydrocracking catalyst at pressures below about 2,500 p.s.i.g. and temperatures between about 400° and 750° F., and adjusting the hydrogen sulfide concentration in the reaction mixture upwardly when the major desired product is high octane gasoline, and downwardly when the major desired product is a highly paraffinic jet fuel and/or diesel fuel. In a preferred aspect of the invention, two separate hydrocracking stages are employed, the first operating in the presence of hydrogen sulfide and nitrogen compounds and at relatively high temperatures to produce high octane gasoline, and the second operating with a Group VIII noble metal hydrocracking catalyst, and substantially in the absence of nitrogen compounds, to produce either high octane gasoline when the hydrogen sulfide concentration is relatively high, or highly saturated jet fuels and/or diesel fuels at lower hydrogen sulfide concentrations. The process thus affords maximum flexibility, permitting the refiner to meet changing market demands for the various products, while minimizing the quantity of low octane gasoline produced which must be subjected to a subsequent severe reforming step to obtain the desired octane balance in the refinery.

A principal object of this invention is to provide an integrated hydrocracking process designed mainly for the production of gasoline, but which can be easily regulated to produce a high quality jet fuel boiling for example in the 350–550° F. range, and/or a high quality diesel fuel boiling for example in the 400–800° F. range. A further objective is to minimize the total reforming capacity required in any given refinery to produce the desired quantity of high octane gasoline. Another object is to provide a flexible hydrocracking process which will permit the refiner to shift rapidly and easily from jet fuel to gasoline products as his market may require. Other objects will be apparent from the more detailed description which follows.

The invention rests basically upon our discovery that, within the temperature range of about 400–750° F., Group VIII noble metal hydrocracking catalysts are remarkably sensitive to hydrogen sulfide concentration in the reaction mixture, in respect to product aromaticity. Moreover, this sensitivity is reversible, and is such that variations in hydrogen sulfide concentration, within the range of about 0 to 0.5 millimole per mole of hydrogen, are substantially immediately reflected in a significant change in product aromaticity even without a change in hydrocracking temperature. This sensitivity does not appear to be displayed at temperatures above about 750° F., while at pressures above about 2,500 p.s.i.g., the magnitude of the effect is substantially decreased. It is found also that this reversible sensitivity to hydrogen sulfide concentration is not displayed in the same order of magnitude by other hydrocracking catalysts such as those wherein the hydrogenating component is nickel. It is found also that variations in hydrogen sulfide concentration within the range above about 0.5 millimole, or in the range below about 0.01 millimole per mole of hydrogen, bring about relatively insignificant changes in product aromaticity. The critical concentration range for practical purposes hence appears to lie between 0.01 and 0.5 millimole. While we do not wish to be found by any theoretical explanation for this observed sensitivity to hydrogen sulfide concentration, it would appear to involve in some degree a change in the Group VIII noble metal hydrogenation component from the free metal to a sulfide state, and vice versa. But we do not exclude the possibility that other operative factors may be involved.

Another critical feature of the process resides in the use of an initial hydrocarbon feedstock which is substantially aromatic in character. This includes coker distillate gas oils, cycle oils derived from catalytic or thermal cracking operations, as well as aromatic straight-run gas oils. These feedstocks may be derived from petroleum crude oils, shale oils, tar sand oils, coal hydrogenation products and the like. Specifically, it is preferred to employ feedstocks boiling between about 400° and 1,000° F., having an API gravity of about 20–35°, and containing at least about 20% by volume of aromatic hydrocarbons. Such oils may also contain from about 0.1% to 5% by weight of sulfur and from about 0.01% to 2% by weight of nitrogen. Aromatic feedstocks of this character are required inasmuch as the low temperatures and relatively high pressures required do not thermodynamically favor the synthesis of aromatics from non-aromatics, and hence the aromatics appearing in the product are primarily unhydrogenated fragments of high boiling aromatics initially present in the feed. If non-aromatic feed-stocks were employed, the products obtained under the conditions of pressure and temperature employed herein would be almost entirely paraffinic and/or naphthenic, regardless of the hydrogen sulfide concentration in the reaction mixture.

While as noted above, the initial feedstock may contain nitrogen compounds, it is important to note that in the particular contacting stage of the process in which the hydrogen sulfide concentration is to be varied periodically in order to change the aromaticity of the product, nitrogen should be substantially absent, i.e., below about 25 parts per million by weight, based on hydrocarbon feedstock. The presence of nitrogen compounds militates against a flexible operation (embracing in one cycle the production of highly saturated products), because of the relatively high temperatures, usually above about 700° F., which are required in order to overcome the poisoning effect of the nitrogen compounds. And, as noted above, at these high temperatures, variations in hydrogen sulfide concentration are relatively insignificant with respect to product aromaticity, the product always being substantially aromatic in character.

It is further to be noted that the hydrocracking catalyst employed in the zone where flexibility of product aromaticity is desired, should preferably be one comprising a very active cracking base. This is required in order to obtain the desired cracking activity at temperatures below 750° F. In general, the cat-A cracking activity of the cracking component should be at least about 25 and preferably greater than about 35. Catalysts of this nature will be described more in detail hereinafter.

The process of this invention may be operated either in a single stage or in plural stages of hydrocracking. Raw feedstocks may be employed in many instances, but in most cases it is preferable to employ a hydrofining pretreatment to effect at least partial desulfurization, denitrogenation, stabilization, etc. Where the feedstock contains substantial quantities of nitrogen compounds, it is normally preferable to employ two stages of hydrocracking, and still more preferable a preliminary hydrofining treatment ahead of the first hydrocracking stage. The hydrofining treatment in this instance may desirably be of the "integral" type, i.e., wherein the entire hydrofiner effluent is passed directly through the first hydrocracking stage without intervening condensation or purification.

Since in these multi-stage operations, the first stage feed will normally contain substantial quantities of sulfur and/or nitrogen compounds in the form of hydrogen sulfide and ammonia, the first stage will usually be operated exclusively for gasoline production, since the hydrocarbon product is inherently substantially aromatic. The feed to the second hydrocracking stage is primarily the unconverted oil from the first stage, and is substantially free of nitrogen compounds and sulfur compounds. The second stage may hence be operated with any desired concentration of hydrogen sulfide present. The desired hydrogen sulfide concentration can be maintained for example by blending the feed with a sulfur-containing feed, varying the proportion of hydrogen sulfide-containing recycle gas employed therein, simply adding hydrogen sulfide, or any equivalent method. Any product oil from the second hydrocracking stage which is not converted to the desired boiling range, is normally recycled back to that stage.

Reference is now made to the attached drawing, which is a flow sheet illustrating the invention in one of its multi-stage adaptations. In the succeeding description, it will be understood that the drawing has been simplified by the omission of certain conventional elements such as valves, pumps, compressors, and the like. Where heaters or coolers are indicated, it will be understood that these are merely symbolic, and in actual practice many of these will be combined into banks of heat exchangers and fired heaters, according to standard engineering practice. The product fractionating equipment is merely illustrative of a system providing for maximum flexibility in handling different feedstocks and products, in actual practice, specific desired product distributions would require modifications in the frctionating equipment for maximum economy.

In the drawing, the initial feedstock is brought in via line 2, mixed with recycle and makeup hydrogen from line 4, preheated to incipient hydrofining temperature in heater 6, and then passed directly into hydrofiner 8, where catalytic hydrofining proceeds under substantially conventional conditions. Suitable hydrofining catalysts include for example mixtures of the oxides and/or sulfides of cobalt and molybdenum, or of nickel and tungsten, preferably supported on a carrier such as alumina, or alumina containing a small amount of coprecipitated silica gel. Other suitable catalysts include in general the oxides and/or sulfides of the Group VI–B and/or Group VIII metals, preferably supported on adsorbent oxide carriers such as alumina, silica, titania, and the like. The hydrofining operation may be conducted either adiabatically or isothermally, and under the following general conditions:

HYDROFINING CONDITIONS

| | Operative | Preferred |
|---|---|---|
| Temperature, ° F. | 600–850 | 650–750 |
| Pressure, p.s.i.g. | 500–3,000 | 800–2,000 |
| LHSV, v./v./hr. | 0.5–10 | 1–5 |
| $H_2$/oil ratio, s.c.f./b. | 500–20,000 | 1,000–10,000 |

The above conditions are suitably adjusted so as to reduce the nitrogen content of the feed to below about 25 parts per million, and preferably below about 10 parts per million.

The total hydrofined product from hydrofiner 8 is withdrawn via line 10 and transferred via heater exchanger 12 to first-stage hydrocracker 14, without intervening condensation or separation of products. Heat exchanger 12 is for the purpose of suitably adjusting the temperature of feed to hydrocracker 14; this may require either cooling or heating, depending upon the respective hydrofining and hydrocracking temperatures employed. Inasmuch as first-stage hydrocracker 14 and hydrofiner 8 are preferably operated at essentially the same pressure, is entirely feasible to enclose both contacting zones within a single reactor, using appropriate temperature control means.

The catalyst employed in reactor 14 may consist of any desired combination of a refractory cracking base with a suitable hydrogenating component. Suitable cracking bases include for example mixtures of two or more difficulty reducible oxides such as silica-alumina, silica-magnesia, silica-zirconia, alumina-boria, silica-titania, silica-zirconia-titania, acid treated clays and the like. Acidic metal phosphates such as aluminum phosphate may also be used. The preferred cracking bases comprises composites of silica and alumina containing about 50–90% silica; coprecipitated composites of silica, titania, and zirconia containing between 5% and 75% of each component; partially dehydrated, zeolitic, crystalline molecular sieves, e.g., of the "X" or "Y" crystal types, having relatively uniform pore diameters of about 8 to 14 Angstroms, and comprising silica, alumina and one or more exchangeable zeolitic actions.

A particularly active and useful class of molecular sieve cracking bases are those having a relatively high $SiO_2/Al_2O_3$ ratio, e.g., between about 2.5 and 6.0. The most active forms are those wherein the exchangeable zeolitic cations are hydrogen and/or a divalent metal such as magnesium, calcium or zinc. In particular, the "Y" molecular sieves, wherein the $SiO_2/Al_2O_3$ ratio is about 5, are preferred, either in their hydrogen form, or a divalent metal form. Normally, such molecular sieves are prepared first in the sodium or potassium form, and the monovalent metal is ion-exchanged out with a divalent metal, or where the hydrogen form is desired, with an ammonium salt followed by heating to decompose the zeolitic ammonium ion and leave a hydrogen ion. It is not necessary to exchange out all of the monovalent metal; the final compositions may contain up to about 6% by weight of $Na_2O$, or equivalent amounts of other monovalent metals. Molecular sieves of this nature are described more particularly in Belgian Pats. Nos. 577,642, 598,582, 598,683 and 598,682.

As in the case of the X molecular sieves, the Y sieves also contain pores of relatively uniform diameter in the individual crystals. In the case of X sieves, the pore diameters may range between about 6 and 14 A., depending upon the metal ions present, and this is likewise the case in the Y sieves, although the latter usually are found to have crystal pores of about 9 to 10 A. in diameter.

The foregoing cracking bases are compounded, as by impregnation, with from about 0.5% to 25% (based on free metal) of a Group VI-B or Group VIII metal promoter, e.g., an oxide or sulfide of chromium, tungsten, cobalt, nickel, or the corresponding free metals, or any combination thereof. Alternatively, even smaller proportions, between about 0.05% and 2% of the metals platinum, palladium, rhodium or iridium may be employed. The oxides and sulfides of other transitional metals may also be used, but to less advantage than the foregoing.

In the case of zeolitic type cracking bases, it is desirable to deposit the hydrogenating metal thereon by ion exchange. This can be accomplished by digesting the zeolite with an aqueous solution of a suitable compound of the desired metal, wherein the metal is present in a cationic form, and then reducing to form the free metal, as described for example in Belgian Pat. No. 598,686.

A particularly suitable class of hydrocracking catalysts is composed of about 75–95% by weight of a coprecipitated hydrocracking base containing 5–75% $SiO_2$, 5–75% $ZrO_2$, and 5–75% $TiO_2$, and incorporated therein from about 5–25%, based on free metal, of a Group VIII metal or metal sulfide, e.g., nickel or nickel sulfide.

The process conditions in hydrocracker 14 are suitably adjusted so as to provide about 20–60% conversion to gasoline per pass, while at the same time permitting relatively long runs between regenerations, i.e., from about 2 to 8 months. The specific selection of operating conditions depends largely on the nature of the feedstock, pressures in the high range normally being used for highly aromatic feeds, or feeds with high endpoints. The range of operative conditions contemplated for reactor 14 are as follows, assuming the feed thereto contains more than about 25 parts per million of nitrogen:

FIRST-STAGE HYDROCRACKING CONDITIONS

| | Operative | Preferre |
|---|---|---|
| Temperature, ° F | 625–850 | 650–800 |
| Pressure, p.s.i.g | 400–2,500 | 800–2,000 |
| LHSV, v./v./hr | 0.5–10 | 1–5 |
| $H_2$/oil ratio, s.c.f./b | 500–20,000 | 1,000–10,000 |

The effluent from hydrocracker 14 is withdrawn via line 16, condensed in condenser 18, then mixed with wash water injected via line 20 into line 22, and the entire mixture is then transferred to high-pressure separator 24. Sour recycle hydrogen is withdrawn via line 26, and aqueous wash water containing dissolved ammonia and some of the hydrogen sulfide is withdrawn via line 28. The liquid hydrocarbon phase in separator 24 is then flashed via line 30 into low-pressure separator 32, from which flash gases comprising methane, ethane, propane and the like are withdrawn via line 34. The liquid hydrocarbons in separator 32 are then transferred via line 36 to fractionating column 38.

Fractionating column 38 is operated primarily for the purpose of recovering $C_7$+ gasoline and an unconverted gas oil feed for the second-stage hydrocracker. Light gasoline, boiling up to the $C_6$ range is normally taken off as overhead via line 40. The $C_7$+ gasoline is withdrawn as a side-cut via line 42. The bottoms from column 38 constitutes the primary feedstock for the second-stage hydrocracking, and is withdrawn via line 50 for that purpose.

The second-stage feedstock in line 50 is then mixed with recycle and makeup hydrogen from line 58, preheated to incipient hydrocracking temperatures in heater 60, and passed into second-stage hydrocracker 62. This feedstock differs considerably from the feed to the first-stage hydrocracker, in that it is substantially free of nitrogen compounds and sulfur compounds. The choice is thus presented of operating the second stage with or without significant amounts of sulfur being present. In the modification illustrated, variations in sulfur concentration in hydrocracker 62 are obtained by the alternate use of separate and mixed hydrogen recycle gas systems from hydrocrackers 14 and 62. The recycle gas from separator 24 normally contains a substantial proportion of hydrogen sulfide which was not removed by the previous water-washing operation. To operate hydrocracker 62 substantially in the absence of sulfur (separate recycle systems) valve 51 is opened and valves 52 and 54 closed, thus sending the sour recycle gas from line 26 through line 4, back to hydrocracker 14, and the sweet recycle gas from separator 68 back to hydrocracker 62 via line 70 and 58. To operate with added sulfur, valve 51 is closed and valves 52 and 54 opened, thereby diverting sour recycle gas from line 26 into lines 55 and 70, where it mingles with sweet recycle gas from separator 68. The mixed gases are then split, one portion flowing to hydrofiner 8 via lines 56 and 4, and the other portion flowing to hydrocracker 62 via line 58.

In the sweet cycle of operation in hydrocracker 62, it is normally desirable to adjust the process variables, principally temperature, so as to maximize jet fuel and/or diesel fuel production, and minimize the conversion to gasoline. Specifically, it is preferred to limit the conversion to gasoline to below about 20% per pass by volume. To achieve this objective, while obtaining maximum quality of the jet fuel-diesel fuel products, the hydrogen sulfide concentration should be maintained at a value below about 0.2, and preferably below about 0.01 millimole per mole of hydrogen, and the other process conditions are adjusted within the following ranges:

SWEET SECOND-STAGE OPERATING CONDITIONS

| | Operative | Preferred |
|---|---|---|
| Temperature, ° F | 400–750 | 450–650 |
| Pressure, p.s.i.g | 400–2,500 | 800–2,000 |
| LHSV, v./v./hr | 0.5–15 | 1–10 |
| $H_2$/oil ratio, s.c.f./v | 500–20,000 | 2,000–12,000 |

As will be understood by those skilled in the art, the specific selection of operating conditions within these ranges will depend on several factors, mainly the relative activity of the catalyst and general refractoriness of the feed.

In the sour cycle of operation in hydrocracking 62, the process variables are normally adjusted so as to obtain a maximum conversion to gasoline per pass which is consistent with the desired run length (which in turn depends on the rate of catalyst deactivation), and desired efficiency of conversion to gasoline. If the crack per pass is too high, the catalyst deactivation rate is accelerated, and a relatively large proportion of feed is converted to $C_1$–$C_3$ dry gases and butanes. Satisfactory run lengths (3–12 months) and conversion efficiencies are normally obtained at conversions to 400° F. end-point gasoline of between about 40 and 80% by volume per pass. To achieve these objectives, while obtaining maximum gasoline quality, the hydrogen sulfide concentration should be maintained at a value above about 0.01, and preferably above about 0.2 millimole per mole of hydrogen, and the other process conditions are adjusted within the following ranges:

SOUR SECOND-STAGE OPERATING CONDITIONS

| | Operative | Preferred |
|---|---|---|
| Temperature, ° F | 450–850 | 500–750 |
| Pressure, p.s.i.g | 400–2,500 | 800–2,000 |
| LHSV, v./v./hr | 0.5–10 | 1–5 |
| $H_2$/oil ratio, s.c.f./b | 500–20,000 | 2,000–12,000 |

The catalyst used in hydrocracker 62 comprises about 0.05–3% by weight of a Group VIII noble metal supported on substantially any of the cracking bases previously described for use in hydrocracker 14. Specifically included are the metals, ruthenium, rhodium, palladium, osmium, iridium and platinum, with palladium being preferred. Specifically preferred cracking bases are the high-silica zeolitic molecular sieves, and especially the decationized or divalent metal forms of the Y molecular sieves previously described.

At the conversion levels and conditions prescribed for the second-stage hydrocracker, the run length between regenerations can be adjusted to coincide substantially with the run length in reactor 14, e.g., between about 3 and 12 months. In extended runs such as these, it is normally preferable to maintain substantially constant conversion in each stage by incrementally raising the temperature as the activity of the catalyst declines. The rate of catalyst decline in reactors 14 and 62 under the prescribed conditions is such that constant conversion in both reactors can be obtained by raising the respective temperatures between about 0.1° and 3° F. per day, on the average. The average temperature in hydrocracker 62 will normally be about 25°–125° F. lower than the average temperature in hydrocracker 14.

The total effluent from hydrocracker 62 is withdrawn via line 64, condensed in cooler 66 and transferred to high pressure separator 68, from which recycle hydrogen is withdrawn via line 70 and utilized as previously described. The condensed hydrocarbons in separator 68 are then flashed via line 72 into low pressure separator 74, from which $C_1$–$C_3$ flash gases are withdrawn via line 76. The liquid hydrocarbon product in separator 74 is withdrawn via line 78 and transferred to second-stage product fractionation column 80, wherein it is fractionated into various gasoline, jet fuel and disel fuel fractions, as may be desired. Light gasoline blending stock is withdrawn as overhead via line 82 $C_7$+ gasoline via line 84, a diesel bottoms fraction via line 86, and a jet fuel side-cut via line 88. The jet fuel side-cut is transferred to a small stripping column 90, from which overhead gasoline hydrocarbons are returned to column 80 via line 92. During the sweet operating cycle, the entire bottoms from stripper 90 may be withdrawn from the system via line 94 and sent to jet fuel blending and storage facilities. During the sour operating cycle, the jet fuel fraction from line 94 is normally diverted via line 96 and recycled to second-stage hydrocracker 62 via line 50. Also, during the sour operation, the diesel fraction withdrawn as bottoms via line 86 is recycled via lines 98 and 50 to hydrocracker 62. Where both the jet fuel and diesel fuel fractions are to be recycled, there is of course no need to recover them separately, and hence both fractions can be recovered as bottoms from column 80 and recycled via lines 86, 98 and 50, thus eliminating the need for stripping column 90. Where maximum jet fuel production is desired during the sweet operating, all or a portion of the diesel fraction in line 86 may be recycled to hydrocracker 62 for conversion to jet fuel. It will be understood that the choice of the various recycle alternatives depends largely upon the desired refinery balance and market demands.

The following examples are presented to illustrate certain critical variables in the process, as well to illustrate the operation and results of the process as above described in connection with the drawing. These examples should not however be construed as limiting in scope:

EXAMPLE I

This example demonstrates the remarkable flexibility of the process of this invention in shifting rapidly from highly paraffinic to moderately aromatic products.

The feedstock was an unconverted gas oil (400–740° F. boiling range) derived from a previous hydrofining-hydrocracking operation, containing about 37% by weight of total aromatics and about 7 parts per million of sulfur by weight. This amount of sulfur corresponds to 0.0036 millimole of hydrogen sulfide per mole of hydrogen in the reaction mixture. The catalyst was a copelleted mixture of (1) 50% by weight of 100–325 mesh activated alumina, the alumina being impregnated with 25% by weight of nickel oxide, and (2) 50% by weight of a powdered, decationized Y molecular sieve loaded by ion-exchange with 0.5% by weight of palladium. Process conditions constant throughout the run were:

| | |
|---|---|
| Pressure, p.s.i.g. | 1,500 |
| LHSV | 1.5 |
| $H_2$/oil ratio, scf./b. | 8,000 |

During the initial 450 hours of processing at about 50% conversion to $C_7$–4° F. end-point gasoline (temperature, 560–575° F.), and with no sulfur added to the feed, the product characteristics were as follows:

| | $C_7$–400° F. gasoline | 400° F.+ gas oil |
|---|---|---|
| Total aromatics, vol. percent | 0.4–0.6 | 0.1–0.5 |
| Octane No.: | | |
| F-1 plus 3 ml. TEL | 73.8–75.0 | |
| F-1 clear | 51.5–54.0 | |

The foregoing operation was then modified for 8 hours by incorporating 0.5% by weight of sulfur (as thiophene) in the feed, corresponding to about 2.44 millimoles of $H_2S$ per mole of hydrogen. At 620° F. (to maintain 50% conversion to gasoline), the product characteristics were as follows:

| | $C_7$–400° F. gasoline | 400° F.+ gas oil |
|---|---|---|
| Total aromatics, vol. percent | 19.9 | 22 |
| Octane No.: | | |
| F-1 plus 3 ml. TEL | 83.4 | |
| F-1 clear | 65.5 | |

After the 8-hour run with 0.5% sulfur in the feed, the original low-sulfur feed was used for 8 hours at 624° F., the product characteristics then being:

| | $C_7$–400° F. gasoline | 400° F.+ gas oil |
|---|---|---|
| Total aromatics, vol. percent | 0.9 | 1.23 |
| Octane No.: | | |
| F-1 plus 3 ml. TEL | 78.9 | |
| F-1 clear | 57.5 | |

It will thus be apparent that product aromaticity is almost immediately responsive to changes in sulfur concentration. This responsiveness however, is only apparent at temperatures below about 750° F., for when the above run was continued without sulfur until the temperature level reached 725° F. (to maintain the 50% conversion to gasoline with the relatively more deactivated catalyst), the $C_7$–400° F. gasoline product contained 31.5% aromatics which is only slightly lower than the aromaticity obtainable at this temperature in the presence of added sulfur. However, the efficiency of conversion to $C_7$–400° F. gasoline was only 42% at 725° F., compared to 75–80% at 570–625° F. "Efficiency" is a measure of the proportion of feed converted which went to the desired product, and in this case is expressed as: (volumes of $C_7$–400° F. gasoline, percent of fresh feed) ÷ (total volume percent conversion of fresh feed) × 100.

EXAMPLE II

A run similar to that of Example I was carried out, using as the catalyst a magnesium "Y" molecular sieve containing about 3% by weight of zeolitic magnesium, and loaded by ion-exchange with 0.5% by weight of palladium (Linde hydrocracking catalyst MB 5382). During a pre-run period this catalyst was heavily sulfided for 8 hours with a feed containing 2.5% sulfur. Sulfur-free feed (7 p.p.m. sufur) was then fed to the unit for 44 hours at 600° F., and then 0.5% sulfur was added for 8 hours at 641° F. The results were as follows:

| | Total aromatics, vol. percent | Octane | |
|---|---|---|---|
| | | F-1 plus 3 ml. TEL | F-1 clear |
| Sulfur-free feed, 600° F.: | | | |
| $C_7$–400° F. gasoline | 0.4 | 73.4 | 52.5 |
| 400° F. plus gas oil | 0.22 | | |
| 0.5% sulfur feed, 641° F.: | | | |
| $C_7$–400° F. gasoline | 20.9 | 85.2 | 68.0 |
| 400° F. plus gas oil | 23.3 | | |

The gas oil products produced from the sulfur-free opertion of this example, and Example I, constitute excellent diesel fuels, and by fractionating said products to 550° F. end-point, excellent jet fuels are obtained. The gas oils produced from the high-sulfur feeds are preferably recycled to the hydrocracker for further conversion to aromatic gasoline.

The low-octane gasolines produced from the sulfur-free runs are preferably subjected to catalytic reforming, while the high-octane gasolines produced from the high-sulfur feeds can be used directly as gasoline blending stocks.

EXAMPLE III

This example illustrates preferred techniques and results obtainable in practicing the invention in a two-stage modification, substantially as illustrated in the drawing. The catalyst used in the hydrofining pretreatment is 3% CoO and 15% $MoO_3$ on a carrier composed of 5% $SiO_2$ coprecipitated with 95% $Al_2O_3$, the catalyst being sulfided before use. The catalyst used in both stages of hydrocracking is similar to that of Example I, being a copelleted mixture of (1) 50% by weight of 100–325 mesh activated alumina, the alumina being impregnated with 25% by weight of NiO, and (2) 50% by weight of a powdered, decationized Y molecular sieve loaded by ion exchange with 1% by weight of palladium. The initial feed is a blend of coker distillate and thermally cracked gas oils derived from California crude oils. After an initial hydrofining treatment, the total hydrofining effluent is passed to the first stage of hydrocracking where hydrocracking proceeds in the presence of the ammonia and hydrogen sulfide formed during hydrofining. The first-stage hydrocracking effluent is water-washed and fractionated to recover gasoline product fractions, and a substantially sulfur-free gas oil which constitutes feed to the second stage of hydrocracking.

The second hydrocracking stage is operated alternately with a sour recycle hydrogen stream (about 0.5% by volume $H_2S$), and with a sweet recycle hydrogen stream (less than 10 parts per million $H_2S$). During the sour recycle sequence, the reactor effluent is condensed and fractionated to recover gasoline product fractions, and the remaining oil boiling above the gasoline range is recycled to the second hydrocracking stage.

During the sweet recycle sequence the reactor effluent is fractionated to recover a light gasoline ($C_5$–$C_6$) and heavier products such as a $C_7$+ gasoline for reforming, a jet fuel fraction, and a diesel fuel fraction. Any remaining oil boiling above the end-point of the heaviest product desired is recycled to the second hydrocracking stage.

In one of the sweet second-stage operations shown below, the heaviest desired product is a 330–483° F. jet fuel; in another, a $C_7$-plus reformer charge stock and a 370–630° F. diesel fuel are produced. In the latter case, it will be clear that a jet fuel fraction could also be produced simply by changes in the fractionation employed, without altering the reactor operating conditions or the volume and composition of the recycle oil.

The significant conditions and results of the process are as follows:

Initial feedstock

| | |
|---|---|
| Boiling range, ° F. | 400–857 |
| Gravity, ° API | 22.2 |
| Aromatics, wt. percent | 37 |
| Nitrogen, wt. percent | 0.345 |
| Sulfur, wt. percent | 2.1 |

Hydrofining conditions

| | |
|---|---|
| Temperature, avg. bed, ° F. | 725 |
| Pressure, p.s.i.g. | 1,500 |
| LHSV | 0.75 |
| $H_2$/oil ratio, s.c.f./b. | 8,000 |

First-stage hydrocracking conditions

| | |
|---|---|
| Temperature, avg. bed, ° F. | 765 |
| Pressure, p.s.i.g. | 1,500 |
| LHSV | 1.5 |
| $H_2$/oil ratio, s.c.f./b. | 8,000 |
| Conversion per pass to 400° F. E.P. gasoline and lighter, vol. percent | 40 |

Second-stage hydrocracking conditions

| | |
|---|---|
| Temperature, avg. bed, ° F. | |
| During sour operation | 650 |
| During sweet operation for jet fuel | 565 |
| During sweet operation for diesel fuel | 545 |
| Pressure, p.s.i.g. | 1,500 |
| LHSV | |
| During sour operation | 1.5 |
| During sweet operation | 1.3 |
| $H_2$/oil ratio, s.c.f./b. | 8,000 |

Conversion per pass, vol percent

| | |
|---|---|
| To 400° F. E.P. gasoline during sour operation | 60 |
| To 483° F. E.P. jet fuel during sweet operation for jet fuel | 70 |
| To 630° F. E.P. diesel fuel during sweet operation fuel | 70 |

| | First stage | Second stage: Sour—Gasoline case | Second stage: Sweet—Jet fuel case | Second stage: Sweet—Diesel fuel case |
|---|---|---|---|---|
| Gasoline products, Octane numbers: | | | | |
| Light gasoline ($C_5$–$C_6$) F-1 plus 3 ml. TEL | 99.5 | 99.5 | 98.7 | 97.7 |
| $C_7$-plus gasoline: | | | | |
| F-1 plus 3 ml. TEL | 87.2 | 80.0 | [a] 84.2 | [a] 82.9 |
| End point, ° F. | 400 | 400 | 280 | 332 |
| Second stage jet fuel product: | | | | |
| Boiling range, ° F. | | | 330–483 | |
| Aniline-gravity product | | | 6,866 | |
| Freezing point, ° F. | | | −73 | |
| Volume percent aromatics | | | 0 | |
| CFR luminometer number | | | 75 | |
| Second stage diesel fuel product: | | | | |
| Boiling range, ° F. | | | | 370–630 |
| Aniline point, ° F. | | | | 169.5 |
| Sulfur, wt. percent | | | | 0.0004 |
| Volume percent aromatics | | | | 3 |
| Cetane number | | | | 52.6 |
| Approximate material balances, barrels of combined first and second stage products per 100 barrels fresh feed: | | | | |
| Butanes | | 22 | 13 | 9 |
| $C_5$–$C_6$ gasoline | | 27 | 24 | 16 |
| $C_7$–400° F. gasoline | | 75 | 51 | 39 |
| Jet fuel | | | 33 | |
| Diesel fuel | | | | 52 |

[a] Higher octane numbers here reflect low end-points of the respective gasolines, as compared to the 400° F. end-point gasoline produced during the sour operation. If 400° F. end-point gasolines were produced during these sweet operations, their octane numbers would be lower than that of the gasoline from the sour operation.

Results analogous to those indicated in the foregoing examples are obtained when other hydrocracking catalysts and conditions, other feedstocks and other hydrofining conditions within the broad purview of the above disclosure are employed. It is hence not intended to limit the invention to the details of the examples or the drawing, but only broadly as defined in the following claims:

We claim:

1. In a catalytic hydrocracking process wherein a hydrocarbon feedstock boiling above the gasoline range and containing aromatic hydrocarbons is contacted with a Group VIII noble metal-containing hydrocracking catalyst in the presence of added hydrogen at a pressure between about 400 and 2,500 p.s.i.g. and at a temperature between about 400–750° F. selected to give a substantial conversion to at least one desired product selected from the class consisting of gasoline, jet fuel and diesel fuel, the improved method for controlling and alternately varying the aromaticity of said desired product which comprises: maintaining alternately (A) a relatively high, continuous concentration of hydrogen sulfide, above about 0.01 millimole thereof per mole of hydrogen in the hydrocracking zone, to produce a relatively aromatic product, and (B) a relatively low continuous partial pressure of hydrogen sulfide, below about 0.2 millimole thereof per mole of hydrogen in the hydrocracking zone, to produce a relatively non-aromatic product.]

[2. A process as defined in claim 1 wherein said Group VIII noble metal is palladium.]

[3. A process as defined in claim 1 wherein said hydrocracking catalyst comprises a zeolitic, alumino-silicate molecular sieve of the Y crystal type containing zeolitic cations from the class consisting of hydrogen and divalent metals.]

[4. A process as defined in claim 1 wherein the sulfur concentration during said alternate (A) is maintained at above about 0.2 millimole per mole of hydrogen, and during said alternate (B) at below about 0.01 millimole per mole of hydrogen.]

[5. In a hydrocarbon conversion process wherein a hydrocarbon feedstock containing aromatic hydrocarbons and boiling above the gasoline range is first subjected to a hydrogenating treatment wherein organic sulfur compounds are decomposed and removed, and wherein essentially sulfur- and nitrogen-free hydrocarbon effluent boiling above the gasoline range from said first hydrogenating treatment is subjected to a subsequent hydrocracking step in contact with a Group VIII noble metal-containing hydrocracking catalyst and at a temperature between about 400–750° F. to produce at least one product selected from the class consisting of an aromatic gasoline, a non-aromatic jet fuel and a non-aromatic diesel fuel; the improvement which comprises maintaining in said subsequent hydrocracking step a concentration of hydrogen sulfide which is (A) relatively low, less than about 0.2 millimole per mole of hydrogen when the desired product to be recovered therefrom is selected mainly from the jet fuel-diesel fuel class, and (B) relatively high, greater than about 0.01 millimole per mole of hydrogen when the desired product to be recovered is mainly gasoline.]

[6. A process as defined in claim 5 wherein said Group VIII noble metal is palladium.]

[7. A process as defined in claim 5 wherein said hydrocracking catalyst comprises a zeolitic, alumino-silicate molecular sieve of the Y crystal type containing zeolitic cations from the class consisting of hydrogen and divalent metals.]

[8. A process as defined in claim 5 wherein the sulfur concentration during said alternate (A) is maintained at above about 0.2 millimole per mole of hydrogen, and during said alternate (B) at below about 0.01 millimole per mole of hydrogen.]

[9. A process as defined in claim 5 wherein said hydrogenating treatment is catalytic hydrofining.]

[10. A process as defined in claim 5 wherein said hydrogenating treatment is catalytic hydrocracking.]

[11. A multi-stage hydrocracking process for converting a hydrocarbon feedstock containing aromatic hydrocarbons and boiling above the gasoline range to high-octane gasoline and a desired proportion, from 0% to about 80% by volume, of a non-aromatic product fraction boiling in the jet fuel-diesel fuel range, which comprises:

(A) subjecting said feedstock plus added hydrogen to hydrocracking in a first hydrocracking zone in contact with a hydrocracking catalyst comprising a hydrogenating metal sulfide distributed on a solid cracking base;

(B) maintaining in said first hydrocracking zone a pressure between about 400 and 2,500 p.s.i.g. and a temperature adjusted to give a conversion per pass to 400° F. end-point gasoline of about 20–60% by volume;

(C) fractionating effluent from said first hydrocracking zone to recover high-octane gasoline and unconverted oil;

(D) subjecting said unconverted oil plus added hydrogen to hydrocracking in a second hydrocracking zone in contact with a hydrocracking catalyst comprising a Group VIII noble metal-containing hydrogenating component distributed on a solid cracking base;

(E) maintaining in said second hydrocracking zone a pressure between about 400 and 2,500 p.s.i.g., and a temperature between about 400–750° F. and adjusted to give a substantial conversion per pass to lower-boiling hydrocarbons;

(F) treating the effluent from said second hydrocracking zone to recover at least one product selected from the class consisting of (a) an aromatic gasoline, (b) a non-aromatic jet fuel and (c) a non-aromatic diesel fuel; and (G) maintaining in said second hydrocracking zone a concentration of hydrogen sulfide which is (a) relatively low, less than about 0.2 millimole per mole of hydrogen when the product recovered in step (F) is selected mainly from the jet fuel-diesel fuel class, and (b) relatively high, greater than about 0.01 millimole per mole of hydrogen when the product recovered in step (F) is mainly gasoline.]

[12. A process as defined in claim 11 wherein said feedstock is first subjected to catalytic hydrofining, and the total effluent from said catalytic hydrofining is then subjected to said first hydrocracking step (A).]

[13. A process as defined in claim 11 wherein the catalyst in step (D) comprises palladium distributed on a zeolitic alumino-silicate molecular sieve of the Y crystal type containing zeolitic cations from the class consisting of hydrogen and divalent metals.]

14. A hydrocracking process for converting a [substantially nitrogen-free] hydrocarbon feedstock containing *less than about 25 p.p.m. of nitrogen and at least about 20 volume-percent of* aromatic hydrocarbons and boiling above the gasoline range to high-octane *aromatic* gasoline[,] *boiling in the $C_7$-400°F. range,* which comprises subjecting said feedstock plus added hydrogen to catalytic hydrocracking in contact with a Group VIII noble metal-containing hydrocracking catalyst at a pressure between about 400 and 2,500 p.s.i.g., *a space velocity between about 0.5 and 10,* and a temperature between about 500° and 750° F., *said hydrocracking conditions being adjusted to provide about 40–80 volume percent conversion per pass to 400° F. end-point gasoline,* and maintaining during said contacting a concentration of hydrogen sulfide greater than about 0.01 millimole per mole of hydrogen[.], *to thereby produce said high-octane aromatic gasoline.*

15. A process as defined in claim 14 wherein said Group VIII noble metal is palladium.

16. A process as defined in claim 14 wherein said hydrocracking catalyst comprises a zeolitic, alumino-silicate molecular sieve of the Y crystal type containing zeolitic cations from the class consisting of hydrogen and divalent metals.

17. A hydrocracking process for converting a substantially nitrogen-free hydrocarbon feedstock containing *at least about 20 volume percent of* aromatic hydrocarbons and boiling above the gasoline range to a non-aromatic product selected from the class consisting of jet fuel and diesel fuel, which comprises subjecting said feedstock plus added hydrogen to catalytic hydrocracking at a pressure between about 400 and 2,500 p.s.i.g., and a temperature between about 400° and 750° F., in contact with a Group VIII noble metal-containing hydrocracking catalyst, and maintaining during said contacting a concentration of hydrogen sulfide less than about 0.2 millimole per mole of hydrogen.

18. A process as defined in claim 17 wherein said Group VIII noble metal is palladium.

19. A process as defined in claim 17 wherein said hydrocracking catalyst comprises a zeolitic, alumino-silicate molecular sieve of the Y crystal type containing zeolitic cations from the class consisting of hydrogen and divalent metals.

*20. A process as defined in claim 14 wherein said hydrocracking is carried out at a pressure between about 800 and 2,000 p.s.i.g. and a space velocity between about 1 and 5.*

References Cited

The following references, cited by the Examiner, are of record in the patented file of this patent or the original patent.

UNITED STATES PATENTS

| | | | |
|---|---|---|---|
| 3,511,771 | 5/1970 | Hamner | 208—89 |
| 3,520,798 | 7/1970 | Dedinas et al. | 208—111 X |
| 2,604,438 | 7/1952 | Bannerot. | |
| 2,983,670 | 5/1961 | Seubold. | |
| 3,008,895 | 11/1961 | Hansford et al. | |
| 3,015,549 | 1/1962 | Ciapetta et al. | |
| 3,026,260 | 3/1962 | Watkins. | |

DELBERT E. GANTZ, Primary Examiner

U.S. Cl. X.R.

208—89